United States Patent [19]

Catallo

[11] Patent Number: 5,680,885
[45] Date of Patent: Oct. 28, 1997

[54] METHOD FOR REHABILITATING PIPE

[76] Inventor: Giulio Catallo, 5134 Holly Terrace Dr., Houston, Tex. 77045

[21] Appl. No.: 616,773

[22] Filed: Mar. 15, 1996

Related U.S. Application Data

[60] Continuation of Ser. No. 202,933, Feb. 28, 1994, abandoned, which is a division of Ser. No. 958,250, Oct. 8, 1992, abandoned.

[51] Int. Cl.$^6$ .................. F16L 55/16; B29C 17/00
[52] U.S. Cl. .................. 138/98; 138/97; 156/287; 264/36
[58] Field of Search .................. 138/97, 98, 123, 138/124, 125, 126; 156/287, 295; 264/36, 369; 29/402.09

[56] References Cited

U.S. PATENT DOCUMENTS

| | | | |
|---|---|---|---|
| 4,135,958 | 1/1979 | Wood | 156/199 |
| 4,366,012 | 12/1982 | Wood | 156/93 |
| 4,401,696 | 8/1983 | Wood | 156/242 X |
| 4,434,115 | 2/1984 | Chick | 156/287 X |
| 4,439,469 | 3/1984 | Wood | 427/230 |
| 4,581,085 | 4/1986 | Wood | 156/156 |
| 4,581,247 | 4/1986 | Wood | 156/199 X |
| 4,602,974 | 7/1986 | Wood et al. | 156/287 |
| 4,622,196 | 11/1986 | Wood | 156/287 X |
| 4,637,754 | 1/1987 | Wood | 156/287 X |
| 4,714,095 | 12/1987 | Muller et al. | 138/98 |
| 4,758,454 | 7/1988 | Wood | 428/36 |
| 4,770,562 | 9/1988 | Muller et al. | 138/97 X |
| 5,172,730 | 12/1992 | Driver | 138/104 |
| 5,280,811 | 1/1994 | Catallo et al. | 138/98 |

*Primary Examiner*—Patrick Brinson
*Attorney, Agent, or Firm*—Tobor & Goldstein, L.L.P.

[57] ABSTRACT

An improved method of rehabilitating a conduit which is in a damaged or deteriorated state. A lining hose, having a resin absorbing inner layer which is soaked with an excess volume of resin, is expanded and shaped to conformingly line a conduit by inverting a calibration hose under fluid pressure inside the lining hose. The calibration hose is comprised of a resin-absorbent layer and an impermeable layer that outwardly adjoins and surrounds the resin-absorbent layer. After inversion, the resin absorbent layer of the calibration hose contacts and adheres to the resin impregnated inner layer of the lining hose and is impregnated in situ with a portion of the excess volume of resin from the lining hose. Upon curing, the calibration hose becomes an integral part of the liner.

10 Claims, 3 Drawing Sheets

METHOD FOR REHABILITATING PIPE

This application is a continuation of application Ser. No. 08/202,933, filed Feb. 28, 1994, which is a division of application Ser. No. 07/958,250, filed Oct. 8, 1992, all abandoned.

BACKGROUND OF THE INVENTION

The present invention relates to a method of rehabilitating a pipe conduit which is in a damaged or deteriorated state.

Various methods of rehabilitating a pipe conduit which is buried underground are known in the art. Generally speaking, such methods include the use of a liner having a diameter which is substantially the same as the inner diameter of the pipe conduit to be rehabilitated. The liner frequently includes an impermeable layer and an adjacent resin-absorbing layer. This resin-absorbing layer is impregnated with a liquid resin prior to the introduction of the thus treated liner into the pipe conduit. After being properly positioned in the pipe conduit, the liner is pressed against the inner surface of the pipe conduit by fluid pressure.

One such method of lining a pipe is disclosed in U.S. Pat. No. 4,009,063 which discloses a liner comprising a non-woven felt sandwiched between an outer membrane and an inner membrane of plastic sheet material. The non-woven felt material is impregnated with an uncured thermosetting resin. The resin is cured while the liner is held against the inner surface of the pipe conduit so as to form a rigid self-supporting liner. The alleged purpose of this impermeable outer layer is to avoid the need for cleaning the pipe conduit prior to installation of the liner.

The impermeable outer layer of the above-mentioned liner prohibits the liner from bonding to the inner surface of the pipe conduit. Leaky locations, such as cracks or fissures in the pipe conduit or damaged pipe connections, are not sealed, so that ground water which penetrates from the ground into the pipe conduit through such leaky locations collects in the annular space present between the inner surface of the pipe conduit and the outer surface of the liner. Such a construction of the liner also does not prevent axial displacement of the liner with respect to the pipe conduit.

Another method of lining a conduit is disclosed in U.S. Pat. No. 4,064,211. This method utilizes a liner having a resin impregnated inner layer and an impermeable layer outwardly connected and surrounding the inner layer. This liner is introduced into the interior of the pipe conduit by turning over one end region of the liner and causing the turned over region to gradually advance into the interior of the pipe conduit using an inversion process. During this inversion process, the resin impregnated layer is gradually transferred to the exterior of the lining hose by fluid pressure. The resin impregnated layer will contact the inner surface of the pipe conduit. In order to eliminate friction, the liner, before being turned inside out, is supported buoyantly by liquid which serves to carry the liner.

U.S. Pat. No. 4,770,562 discloses a method for rehabilitating a conduit using a lining hose having an outer impermeable layer surrounding and adjacent to an inner resin-absorbent layer. The resin-absorbent layer is saturated with an excess volume of resin. The outer impermeable layer is then perforated to form a plurality of flowthrough openings for the resin. The lining hose is subsequently introduced in a collapsed state into the pipe conduit, and the lining hose is shaped to conformingly line the pipe conduit. The shaping of the lining hose is accomplished by everting an auxiliary hose, also known as a calibration hose, inside the lining hose. The eversion of the calibration hose inside the lining hose will force the excess amount of resin through the flowthrough openings and into contact with the inner surface of the pipe conduit. The excess resin will also fill existing cracks and fissures in the conduit. A variation of the liner described in the U.S. Pat. No. 4,770,562 includes a thin layer of resin-absorbent material outwardly adjacent to the impermeable surface. This thin layer of resin-absorbent material facilitates the spreading of the excess resin once the impermeable layer has been perforated and the shaping of the lining hose process has begun.

The auxiliary hose, or calibration hose, shown in U.S. Pat. No. 4,770,562 is constructed of fluid impermeable material. Although the auxiliary hose may remain in the lining hose, the preferred embodiment of the method disclosed in the '562 patent contemplates the removal of the auxiliary hose after the liner has cured. Removal and retrieval of the calibration hose is an expensive and time-consuming step. Before use, the calibration hose must be waxed with a releasing agent which inhibits adhesion of the calibration hose to the resin impregnated layer of the lining hose. The releasing agent may adversely affect the cure of the resin it contacts. In addition, the calibration hose must be cleaned before it can be rewaxed for the next job. Since calibration hoses must be constructed of various sizes to accommodate the various inside diameters of conduits to be rehabilitated, storage problems are also created by the retrieval of the calibration hose.

Over time the auxiliary hose of the '562 patent has proven to be susceptible to delamination when left inside the lining hose. Delamination can be attributed to the inferior adhesion between the auxiliary hose and the resin of the lining hose. Delamination of the auxiliary hose will ultimately deteriorate until the flow of sewage, water or other material carried by the conduit is impeded. Once this occurs, expensive and time consuming efforts are required to remove the auxiliary hose from the conduit.

The improved stay-in-place calibration hose used in the method of the present invention eliminates the disadvantages described above. Unlike the auxiliary hose disclosed in the '562 patent, the improved calibration hose has a layer of resin absorbing material which contacts the resin-absorbent layer of the lining hose after the calibration hose has been inverted. Excess resin from the lining hose will impregnate the resin-absorbent layer of the calibration hose in situ, thereby causing the calibration hose to become an integral part of the liner. The impermeable layer of the calibration hose becomes the inner surface of the liner after eversion and enhances the durability of the liner that resin alone does not provide.

In addition, the improved calibration hose of the present invention will not be susceptible to delamination like the auxiliary hose of the '562 patent. The construction of the auxiliary hose of the '562 patent is incapable of absorbing resin from the lining hose and thus, it is incapable of becoming an integral part of the liner. As such, it is susceptible to delamination which will ultimately decrease the useful life of the liner or require expensive measures to remove the calibration hose at a later date. Unlike the auxiliary hose of the '562 patent, the calibration hose of the present invention increases the structural strength of the liner by adding another layer of resin and resin absorbent material to the liner. In addition, the impermeable membrane of the calibration hose forms the inner surface of the finished liner which will increase the durability of the liner. Thus, the stay-in-place calibration hose of the present invention combines with the lining hose to form a more durable liner than prior art liners.

3

The unique in situ impregnation of the calibration hose of the present invention has other benefits as well. Since the calibration hose is not impregnated with resin until it is inverted inside the lining hose, the calibration hose has an indefinite shelf life. No labor is required to impregnate the calibration hose. Furthermore, the calibration hose is not susceptible to curing prematurely from exposure to sunlight and may be transported to location in a non-refrigerated truck.

SUMMARY OF THE INVENTION

The present invention is an improved method of rehabilitating a conduit which is in a damaged or deteriorated state. The method includes the steps of soaking a resin absorbing inner layer of a lining hose, which also includes an impermeable layer that outwardly adjoins and surrounds the inner layer, with an amount of resin that exceeds the amount needed to fully saturate the inner layer. The lining hose, having an outer diameter that is substantially the same as the inner diameter of the conduit to be rehabilitated, is subsequently introduced in its collapsed state into the conduit.

The lining hose is expanded and shaped to conformingly line the conduit by inverting a calibration hose under fluid pressure inside the lining hose, said calibration hose comprising a resin-absorbent layer and an impermeable layer that outwardly adjoins and surrounds the resin-absorbent layer. One end of the calibration hose is turned over so that the impermeable layer is maintained between the everting fluid and the resin impregnated lining hose. As the calibration hose is everted into the lining hose, the resin-absorbent layer of the calibration hose contacts and adheres to the resin impregnated inner layer of the lining hose and is impregnated in situ with a portion of the excess volume of resin inside the previously collapsed lining hose. Upon curing, the calibration hose becomes an integral part of the liner, thereby providing additional structural support to the liner. The impermeable layer of the calibration hose becomes the inner surface of the liner after eversion, thereby providing the new liner with increased resistance to deterioration.

BRIEF DESCRIPTION OF THE DRAWINGS

The present invention will be described below in more detail with reference to the accompanying drawings in which.

DETAILED DESCRIPTION OF THE PREFERRED EMBODIMENT

Figure 1:
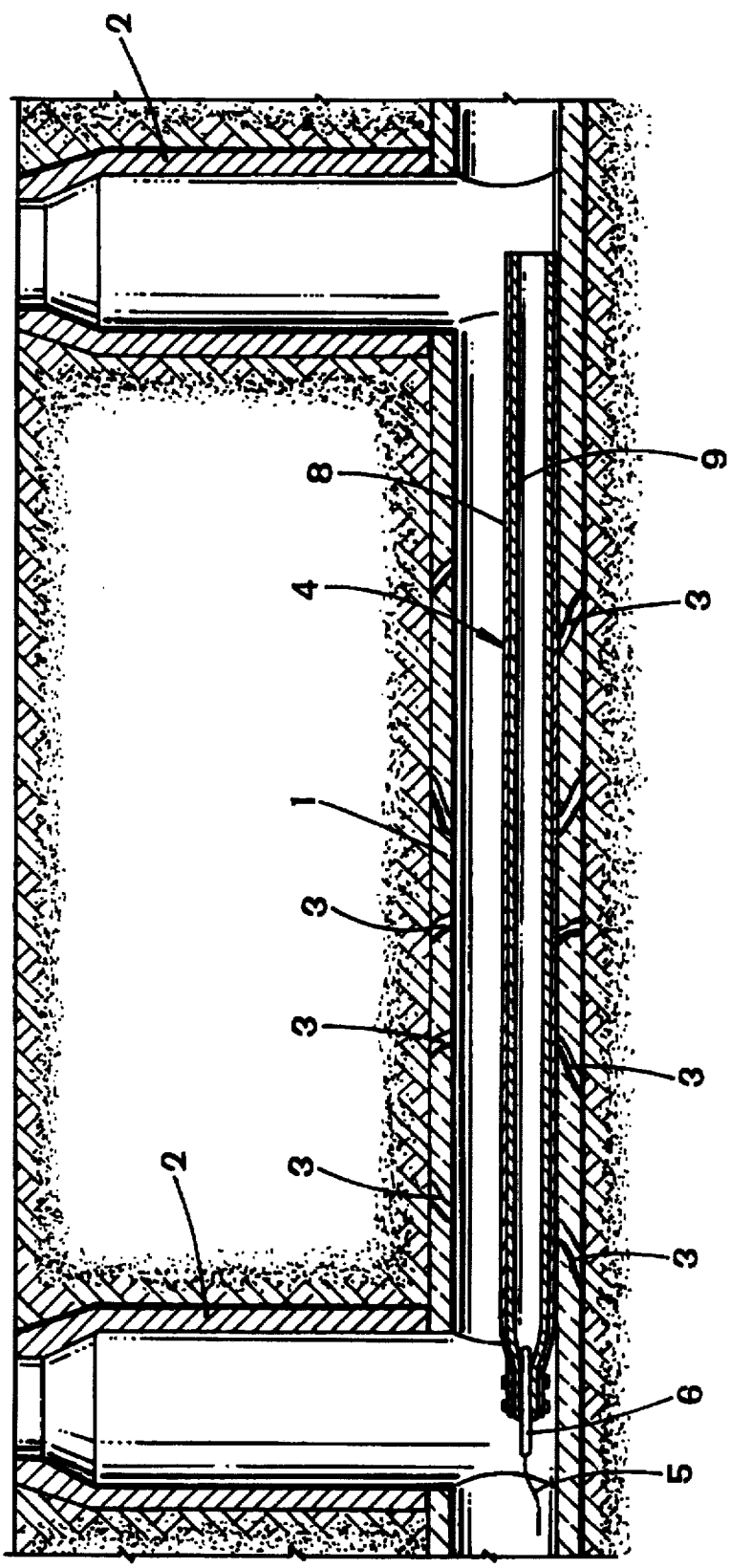
FIG. 1 is a longitudinal sectional view of a pipe conduit section located between two control shafts with a lining hose received therein in its collapsed state.
Figure 2:
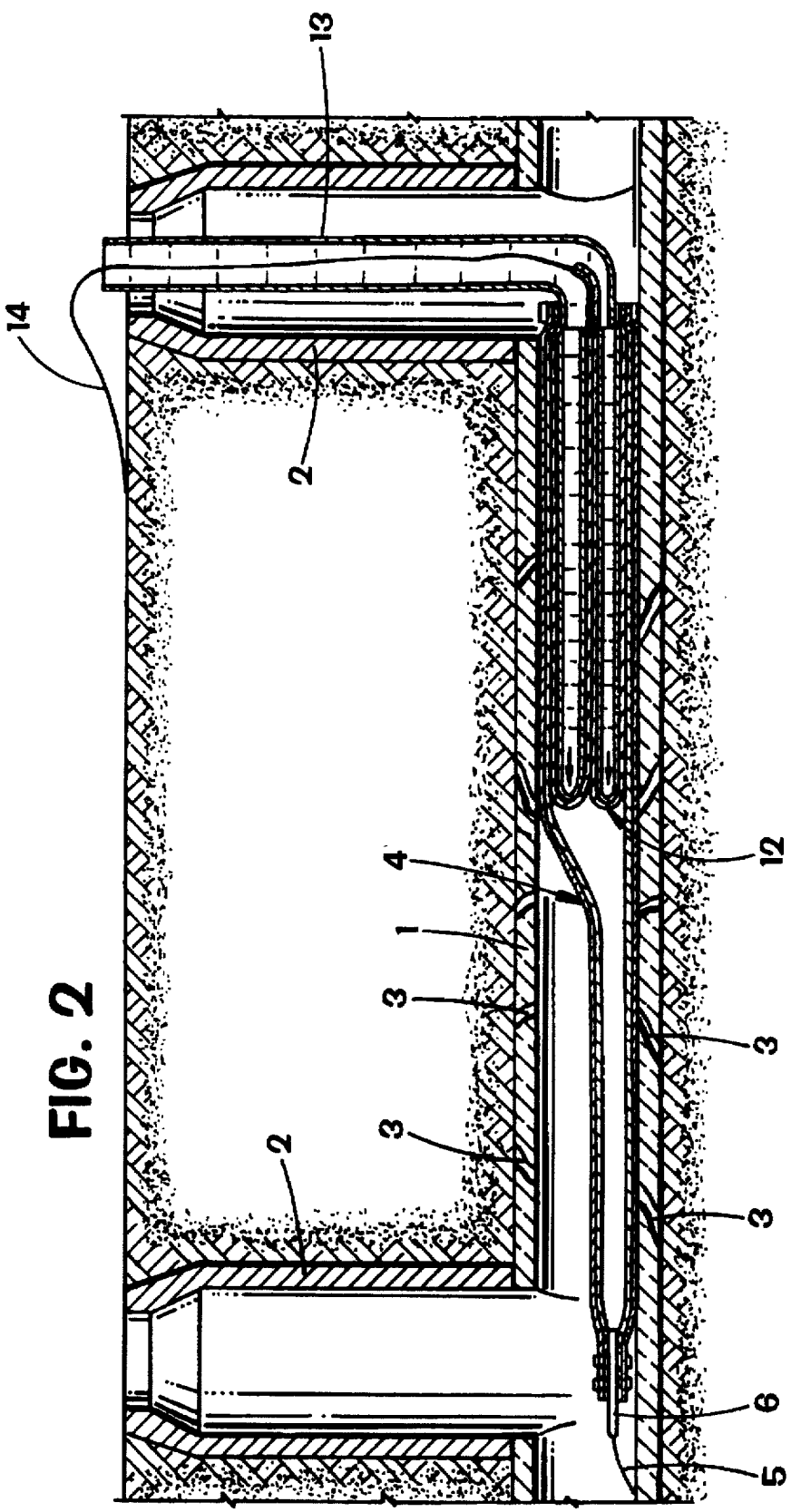
FIG. 2 is a view similar to FIG. 1, illustrating the eversion of the calibration hose into the lining hose.
Figure 3:
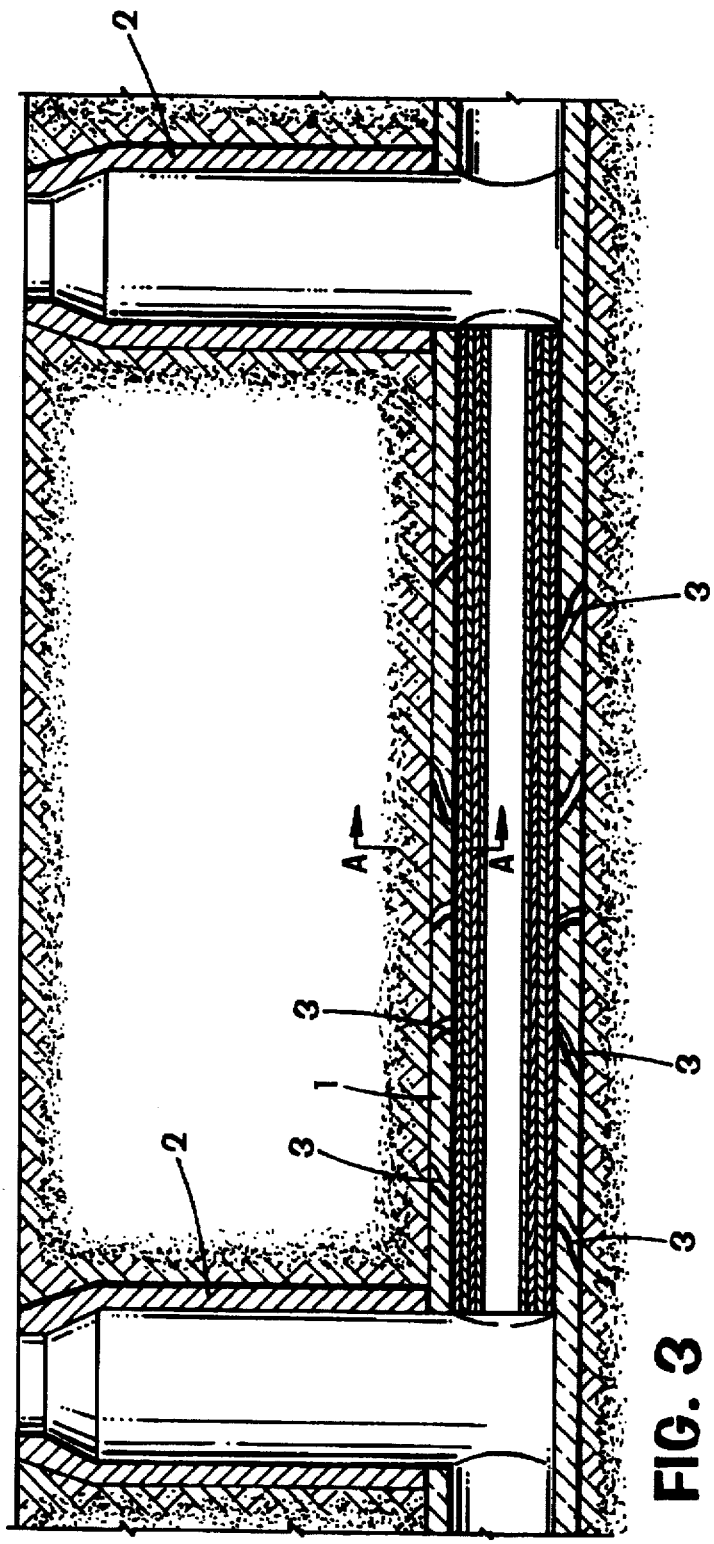
FIG. 3 is a view similar to FIG. 1, illustrating the liner in place after installation.

Referring now to FIG. 1, pipe conduit 1 is buried underground and is provided with control shafts or manholes 2 which lead to the surface. In FIGS. 1-3 there is illustrated a section of the pipe conduit which is situated between the two control shafts. The pipe conduit 1 generally is in a deteriorated shape and may include a plurality of cracks or fissures as illustrated by the numeral 3.

A lining hose 4 is shown to be already received in the interior of the section of the pipe conduit 1 which is situated between the two aforementioned control shafts 2 having been pulled into the illustrated position in its flattened or collapsed state by means of a rope or cable 5 and a non-illustrated winch. The rope or cable 5 is secured to one end of the lining hose 4 by pulling member 6 as illustrated in FIG. 1. The pulling of the lining hose into the pipe section is generally known in the art.

The lining hose 4 consists of an outer covering layer 8 and of an inwardly adjacent inner layer 9 which is constructed of a resin absorbing material. The outer covering layer 8 is typically a synthetic plastic material, such as polyurethane, which is impermeable to fluid. Prior to inserting the lining hose in the conduit to be lined, the resin-absorbent material of the lining hose is soaked with a volume of resin that exceeds the volume needed to totally saturate the resin-absorbent layer. The resin-absorbent layer may be saturated with resin using vacuum impregnation or injection methods which are commonly known in the art. The inner layer 9 of the lining hose as illustrated in FIG. 1 has already been soaked with the excess volume of resin. The lining hose 4 can be made, for example, of a non-woven fibrous material such as polyester needle felt which is provided with an external coating of a synthetic plastic material, such as, for example, polyurethane. In such a construction, the non-woven fibrous material represents the resin-absorbent layer 9 while the external coating of synthetic plastic material represents the outer covering layer 8. The outer covering layer 8 may be fixedly attached to the resin-absorbent layer 9 by adhesion, extrusion or other appropriate methods known in the industry.

The resin soaked lining hose is flexible enough to be pulled into the conduit in a collapsed position. The lining hose will later be expanded to substantially the inner diameter of the conduit to be lined. Accordingly, the lining hose is constructed to have substantially the same diameter as the inner diameter of the pipe conduit to be lined. Due to its flexible nature, the lining hose may be installed through the existing control shaft 2 with little or no excavation work.

Figure 4:
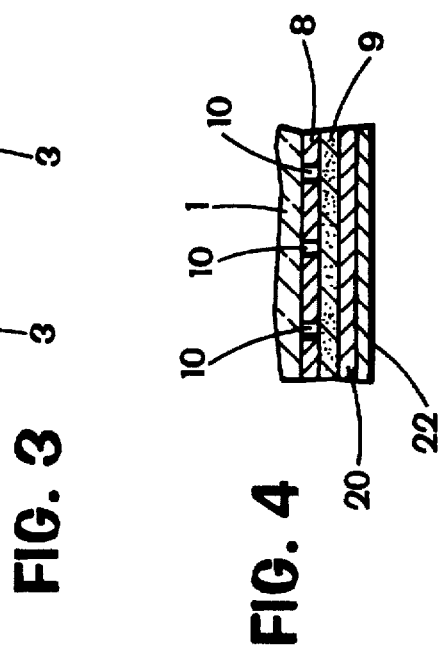
FIG. 4 is a partial sectional view taken along the line A—A of FIG. 3.

The introduction of resin may be performed directly at the installation site or it may be accomplished off-site at a warehouse location or other appropriate location. After the volume of resin has been introduced into the lining hose, the outer covering layer 8 is perforated so as to provide the outer covering layer with flowthrough openings 10 as illustrated in FIG. 4. The perforating of the lining hose may also be performed at the installation site or it may be performed off-site. Methods of perforating the lining hose are known in the art.

One method of introducing the calibration hose 12 into the lining hose 4 situated in the above-mentioned section of the pipe conduit 1 is illustrated in FIG. 2 of the drawings. An inversion pipe 13, which has the configuration of a tubular elbow, is inserted into the proximal control shaft 2 as shown in FIG. 2. The length of the inversion pipe will vary in order to accommodate the height or depth of the control shaft 2. The forwardmost free end of the calibration hose 12 and the associated end of the lining hose 4 are attached to the horizontally extending portion of inversion pipe 13. Before attaching the calibration hose to the inversion pipe, the forward end is turned over outwardly. The turned over portion of the calibration hose and the associated end of the lining hose may be attached to the inversion pipe 13 by use of steel bands or other appropriate means.

Figure 5:
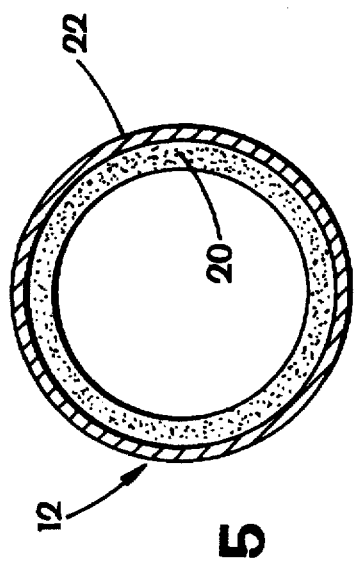
FIG. 5 is a cross sectional view illustrating the calibration hose before the hose is inverted.

As illustrated in FIG. 5, the calibration hose 12 has a resin-absorbent layer 20 and an impermeable layer or membrane 22 that outwardly adjoins and surrounds the resin-absorbent layer. The resin-absorbent layer 20 may be a non-woven fibrous material such as polyester needle felt. A preferred embodiment of the improved calibration hose of this invention utilizes a nonwoven felt of pentaloba fibers which is needled to orient the fibers in such a way to increase the circumferential stretch of the felt while minimizing the longitudinal stretch of the felt material.

The impermeable layer or membrane 22 may be a synthetic plastic material, such as, polyurethane. This outer layer must be impermeable to the fluid used to invert the calibration hose. The impermeable outer layer 22 must be fixedly attached to the resin-absorbent layer 20 by adhesion, extrusion or other appropriate methods known in the art. A preferred embodiment of the calibration hose has a relatively thin layer of resin-absorbent material attached to a film of synthetic material such as polyurethane. By way of example, the above mentioned embodiment utilizes an approximately 16 mils thick film of polyurethane for the outer impermeable layer 22.

Initially, only the connecting end of the calibration hose 12 is turned over outwardly. As a result of the introduction of water into the inversion pipe 13, and in dependence on the attendant pressure buildup, the calibration hose 12 is expanded by the water entering the same from the inversion pipe 13 and, at the same time, the region of turning over of the calibration hose 12 becomes gradually and progressively displaced away from the region of attachment of the liner hose 4 and calibration hose 12 to the inversion pipe 13. To maintain a constant fluid pressure, it is merely necessary to maintain the height of the water column contained in the inversion pipe 13 constant.

As indicated in FIG. 2 by arrows in the already turned over or inverted portion of the calibration hose 12, the pressure exerted by the water present in the calibration hose is directed against the instantaneous leading end of the calibration hose 12 and also perpendicular against the internal surface of the calibration hose 12. As the water pressure everts the calibration hose, the lining hose 4 is expanded, shaped and pressed against the internal surface of the pipe conduit 1. The impermeable layer of the calibration hose prevents the water from contaminating or washing away the resin contained in the lining hose.

A rope or cable 14 may be connected to the trailing end of the calibration hose. The rope or cable may be used to control the forward progress of the calibration hose during inversion. A fire hose or other suitable means may also be attached to the rope or cable for circulating the water during the curing phase.

As the calibration hose everts, the resin-absorbent material of the calibration hose, which is originally located at the interior of the calibration hose, is gradually transferred to the exterior of the calibration hose. Thus, the resin-absorbent material of the calibration hose contacts the resin soaked layer of the lining hose. The water pressure exerted on the calibration hose forces the excess resin not only through the flowthrough openings 10 of the outer covering layer 8 of the lining hose, but also throughout the resin-absorbent layer of the calibration hose. The resin-absorbent layer of the calibration hose functions as a carrier for distributing the excess resin uniformly along the calibration hose. The water pressure exerted on the calibration hose therefore impregnates the resin-absorbent layer of the calibration hose in situ with a portion of the excess resin contained within the lining hose. Accordingly, it is important that a sufficient volume of resin is initially distributed within the lining hose to fully saturate the resin-absorbent layer of the calibration hose as well as having sufficient resin available to pass through the flowthrough openings of the lining hose for bonding the liner to the surface of the conduit and filling the cracks and fissures of the same. The excess resin which passes through the flowthrough openings 10 of the outer layer 8 of the lining hose will bond the lining hose 4 to the internal surface of the conduit 1. Any remaining excess resin will flow into the cracks or fissures 3 of the conduit.

After the lining hose 4 has been fully shaped and expanded to the internal diameter of the pipe conduit, the resin is cured. The curing process may be accelerated by heating the water used to evert the calibration hose. Methods of accelerating the cure of the resin by heating the water are known in the art. After curing, the lining hose, along with the calibration hose, forms a rigid liner which is rigidly connected to the original pipe conduit 1. This is illustrated in FIG. 3. Examples of suitable resins include polyester, vinylester, epoxy and other curable resins.

Upon curing, the calibration hose becomes an integral part of the liner. Instead of having to remove the calibration hose, the calibration hose remains in place and increases the structural integrity of the liner. In addition, the impermeable layer of the calibration hose becomes the internal surface of the liner and provides additional protection against deterioration which would not be available if the calibration hose had been removed as in the prior art method. As noted above, the impermeable layer of the calibration hose can be comprised of a variety of synthetic plastic materials. Accordingly, it is possible to select a synthetic material which is specifically designed to inhibit the deteriorating effects of any known material which will be transported by the conduit, thereby increasing the durability of the liner and ultimately the useful life of the conduit. Examples of the synthetic materials which may be used include polyurethane, polyvinyl chloride, polyethylene or other like materials.

The calibration hose may have an outer diameter that is substantially the same as the inner diameter of the lining hose. In another embodiment, the outer diameter of the calibration hose is slightly smaller than the inner diameter of the lining hose. By way of example, the outer diameter of the calibration hose may be up to 5% smaller than the inner diameter of the lining hose. With such an embodiment, the water pressure used to invert the calibration hose will expand the calibration hose to the inner diameter of the lining hose. Water pressure is maintained against the calibration hose until the resin in the lining hose and calibration hose has cured, thereby forming a rigid liner. Constructing the calibration hose with an outer diameter slightly smaller than the inner diameter of the lining hose will reduce the formation of wrinkles in the liner, thereby providing a smoother and more efficient passageway.

In another embodiment of the present invention, the lining hose may include an additional resin-absorbent material externally and outwardly adjacent to the perforated surface. This outer resin-absorbent material provides a passageway for distributing the excess resin that is forced through the flowthrough openings 10 in layer 8. This outer layer may be a thin layer of non-woven material, such as needled felt, which will facilitate the uniform distribution of the excess resin which flows through the flowthrough openings 10 around the exterior of the lining hose.

In another embodiment of the present invention, the calibration hose is inverted by air or other gaseous mediums. In such an embodiment, it is important that the impermeable layer of the calibration hose is impermeable to the everting medium.

It will be understood by those skilled in the art that certain variations and modifications can be made without departing from the spirit and scope of the invention as defined herein and in the appended claims.

What is claimed is:

1. A method of lining a conduit comprising the steps of:
   (a) positioning a flexible lining hose inside the conduit, the lining hose having a resin-absorbent layer comprising a volume of resin that exceeds the mount needed to fully saturate the resin-absorbent layer;
   (b) positioning a calibration hose inside the conduit, the calibration hose having a resin-absorbent layer that is initially substantially devoid of resin when positioned inside the conduit, and the calibration hose being positioned such that the resin-absorbent layer of the lining hose and the resin-absorbent layer of the calibration hose contact one another;
   (c) providing fluid to create fluid pressure on the inside of the calibration hose to expand the calibration hose and force excess resin to be transferred from the resin-absorbent layer of the lining hose to the previously substantially resin devoid non-impregnated resin-absorbent layer of the calibration hose, thereby impregnating the calibration hose in situ; and
   (d) curing the volume of resin until the lining hose and the calibration hose form a rigid liner.

2. The method of claim 1, wherein sufficient resin is transferred to fully saturate the resin-absorbent layer of the calibration hose.

3. The method of claim 1, wherein the resin-absorbent layer of the calibration hose is not impregnated with resin until the calibration hose is expanded inside the lining hose.

4. The method of claim 1, wherein the step of providing fluid includes the step of providing air to expand the calibration hose.

5. The method of claim 1, wherein the step of providing fluid includes the step of providing water to expand the calibration hose.

6. The method of claim 1, wherein the step of providing fluid includes the step of providing steam to expand the calibration hose.

7. The method of claim 1, wherein the calibration hose is positioned by inversion.

8. The method of claim 1, wherein the calibration hose is positioned by pulling a rope or cable.

9. The method of claim 1, wherein the lining hose is positioned by pulling a rope or cable.

10. A method of lining a conduit comprising the steps of:
    (a) positioning a flexible lining hose inside the conduit, the lining hose having a resin-absorbent layer comprising a volume of resin;
    (b) expanding the lining hose to fit against the conduit by inverting a calibration hose inside the conduit using fluid pressure, wherein the calibration hose has a layer of resin-absorbent material adjacent an impermeable membrane, wherein the layer of resin-absorbent material of the calibration hose is initially substantially devoid of resin when inverted inside the conduit, and wherein the fluid pressure is exerted against the impermeable membrane; and
    (c) impregnating the layer of resin-absorbent material of the calibration hose, in situ, by transferring resin from the resin-absorbent layer of the lining hose to the resin-absorbent layer of the calibration hose by providing fluid pressure inside the calibration hose, thereby compressing the resin-aborbent layer of the lining hose.

* * * * *